United States Patent
Utsunomiya et al.

(10) Patent No.: US 9,342,523 B2
(45) Date of Patent: May 17, 2016

(54) DATA STORAGE DEVICE AND COMPUTER-READABLE STORAGE MEDIUM

(71) Applicants: Ryo Utsunomiya, Tokyo (JP); Kyouhei Ishii, Tokyo (JP)

(72) Inventors: Ryo Utsunomiya, Tokyo (JP); Kyouhei Ishii, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 13/786,704

(22) Filed: Mar. 6, 2013

(65) Prior Publication Data

US 2013/0233917 A1     Sep. 12, 2013

(30) Foreign Application Priority Data

Mar. 9, 2012   (JP) .................................. 2012-053117

(51) Int. Cl.
*G06F 17/00*        (2006.01)
*G06F 17/30*        (2006.01)

(52) U.S. Cl.
CPC ................................ *G06F 17/30091* (2013.01)

(58) Field of Classification Search
CPC .......... G06K 7/10366; G06K 7/10386; G06K 7/10475; G06F 17/30091
USPC .......................................... 235/375, 487, 494
See application file for complete search history.

(56) References Cited

U.S. PATENT DOCUMENTS

| | | | |
|---|---|---|---|
| 2004/0003052 A1* | 1/2004 | Yoda .............................. | 709/217 |
| 2006/0065712 A1* | 3/2006 | Ozaki et al. ................... | 235/375 |
| 2007/0019215 A1* | 1/2007 | Yu .................................. | 358/1.3 |
| 2008/0092154 A1* | 4/2008 | Hogyoku .......................... | 725/1 |
| 2010/0315681 A1* | 12/2010 | Misawa et al. ................ | 358/1.15 |
| 2012/0138671 A1* | 6/2012 | Gaede et al. .................. | 235/375 |
| 2013/0001291 A1* | 1/2013 | Ibrahimbegovic et al. ... | 235/375 |
| 2013/0112760 A1* | 5/2013 | Schory et al. ................. | 235/494 |

FOREIGN PATENT DOCUMENTS

| JP | 2006-252053 | 9/2006 |
|---|---|---|
| JP | 2009-230696 | 10/2009 |

OTHER PUBLICATIONS

Office Action of Notification of Reason(s) for Rejection for Japanese Patent Application No. 2012-053117 Dated Jun. 10, 2015, 7 pages.

* cited by examiner

*Primary Examiner* — Paultep Savusdiphol
(74) *Attorney, Agent, or Firm* — Amin, Turocy & Watson LLP; Gregory Turocy

(57) ABSTRACT

An object of the present invention is to enable a storage location for data, such as a file, to be specified by a simple operation using an identifier such as a two-dimensional code. A data storage device of the present invention is provided with a selecting section which selects arbitrary data, a reading section which reads an identifier, a recognizing section which recognizes a storage destination for the data from a result of reading by the reading section, and a storing section which stores the data in the storage destination recognized by the recognizing section.

6 Claims, 5 Drawing Sheets

C:¥ Group Folder ¥ Group_1 ¥ Document

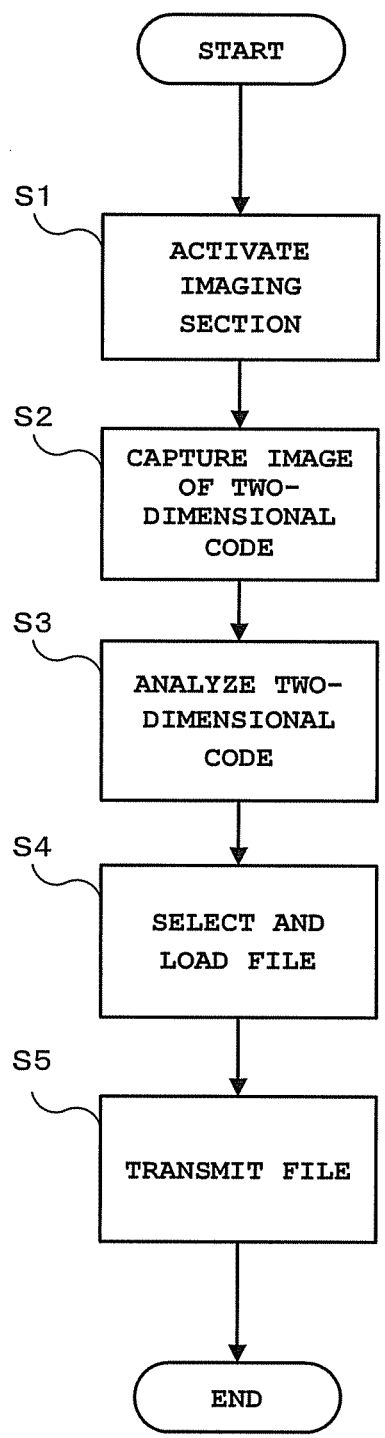

DATA STORAGE DEVICE AND COMPUTER-READABLE STORAGE MEDIUM

CROSS-REFERENCE TO RELATED APPLICATION

This application is based upon and claims the benefit of priority from the prior Japanese Patent Application No. 2012-053117, filed Mar. 9, 2012, the entire contents of which is incorporated herein by reference.

BACKGROUND OF THE INVENTION

1. Field of the Invention

The present invention relates to a data storage device and a computer-readable storage medium. Specifically, the present invention relates to a data storage device and a computer-readable storage medium by which a storage location for data, such as a file, can be specified by a simple operation.

2. Description of the Related Art

A block of data that can be processed by a computer is referred to as "file", and a location where the file is stored is referred to as "folder", although "folder" is a term used in certain operating systems and other operating systems use the term "directory" or the like. In the description below, this location where a file is stored is uniformly referred to as "folder" for convenience of explanation.

The number of folders is initially one per drive, and this folder is a special folder referred to as "root" or "root folder". For example, in a setting where a drive letter is "C", the route folder is expressed by a character string "C:¥", and the user or the system manager can create a desired number of folders within the root folder as required. If necessary, they can also create a desired number of folders within these folders in the root folder. That is, the user or the system manager can create a group of folders having a hierarchical structure within the root folder.

As just described, in many cases, a desired number of folders are created in a hierarchical structure. Although the number of layers, or in other words, the depth of the structure varies, the structure can become very deep depending on the purpose and size of the system.

A disadvantage of these folders having a hierarchical structure is that a target file is difficult to find, which becomes more significant when the structure is deeper. For example, in an instance where a target file is stored in a folder in the n-th layer of the C drive, the character string specifying the file is very long, i.e., "C:¥[name of folder 1]¥[name of folder 2]¥[name of folder 3] . . . ¥[name of folder n]¥[name of target file]".

As a method to easily retrieve a target file from folders having a hierarchical structure, for example, an identifier, such as a two-dimensional code, may be used. As a conventional technology related to two-dimensional codes, there is, for example, "QR CODE (registered trademark) GENERATION DEVICE AND GENERATION METHOD, AND QR CODE (registered trademark) GENERATION SYSTEM" described in Japanese Patent Application Laid-open (Kokai) Publication No. 2006-252053.

The QR code (registered trademark) is a type of two-dimensional code that is an expansion of one-dimensional codes such as bar codes, which expresses numbers and characters by a pattern of dots arranged on a horizontal and vertical two-dimensional plane. This QR code (registered trademark) is capable of expressing information amounting to 7,089 numbers, or 1,800 characters including kanji characters. Other two-dimensional codes are PDF417, DataMatrix, MaxiCode (all of them are registered trademarks), etc.

By the use of the two-dimensional code, a target file can be easily retrieved from folders having a hierarchical structure. For example, in the case of the above-described long character string ("C:¥[name of folder 1]¥[name of folder 2]¥[name of folder 3] . . . ¥[name of folder n]¥[name of target file]"), the target file can be easily retrieved by a two-dimensional code expressing this character string being created and then printed or displayed on a display.

Having a function for reading two-dimensional codes, many modern mobile phones can correctly recognize the long character string and easily access the target file, by reading the two-dimensional code shown on printed material or displayed on a display, and analyzing the code information.

As described above, by the use of the conventionally-known two-dimensional code, a target file can be easily retrieved from folders having a hierarchical structure. However, the storing of an arbitrary file in a desired folder, which is the opposite of file retrieval from a folder, cannot be performed.

This is because, whereas "file retrieval" can be easily performed using a browser function that is a standard feature in network terminals such as mobile phones and personal computers, "file storage" cannot be performed solely by a browser function.

Demand for easy "file storage" is high especially among people using a mobile terminal such as a mobile phone in combination with cloud computing. This is because text input is not efficiently performed by mobile phones and therefore accessing folders located deep within the structure is cumbersome.

SUMMARY OF THE INVENTION

An object of the present invention is to provide a data storage device and a program by which a storage location for data, such as a file, can be specified by a simple operation.

In order to achieve the above-described object, in accordance with one aspect of the present invention, there is provided a data storage device comprising: a selecting section which selects arbitrary data; a reading section which reads an identifier; a recognizing section which recognizes a storage destination for the data from a result of reading by the reading section; and a storing section which stores the data in the storage destination recognized by the recognizing section.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 5 is a diagram showing a flowchart of operations that are performed by the mobile phone 300.

DETAILED DESCRIPTION OF THE PREFERRED EMBODIMENTS

An embodiment in which the present invention has been applied to a highly-functional mobile phone will hereinafter be described with reference to the drawings.

Figure 1:
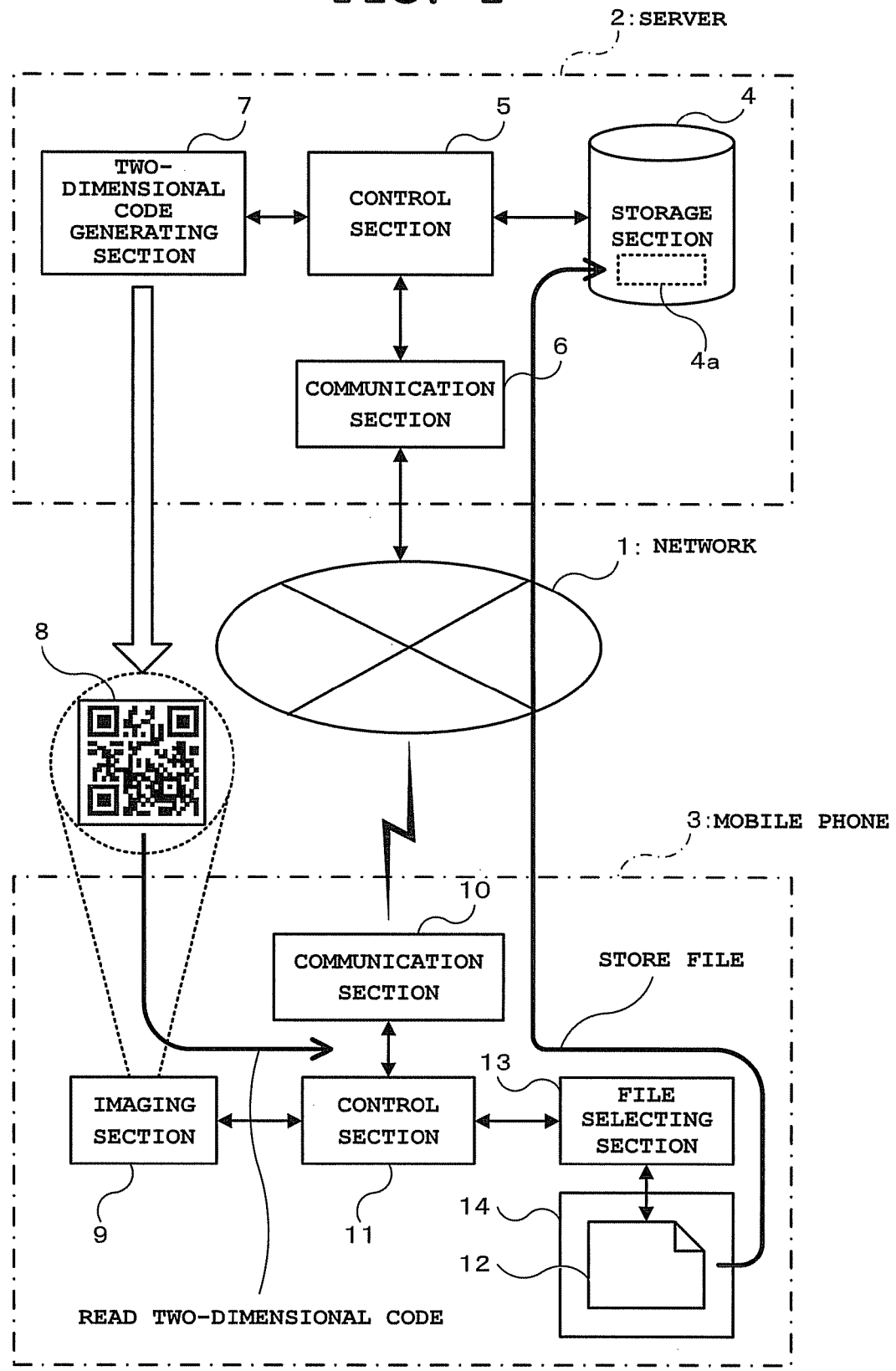
FIG. 1 is an overall conceptual diagram showing data storage according to an embodiment.

FIG. 1 is an overall conceptual diagram showing data storage according to the present embodiment. A server 2 in FIG. 1 is constantly connected to a network 1, such as the Internet. Also, a single or a plurality of mobile phones 3 are connected to this network 1 as required.

The server 2 is a common server-only machine having a well-known configuration and therefore will not be described in detail. In the present embodiment, the server 2 is only required to have at least a storage section 4 such as a hard disk, a control section 5 including a computer, a communication section 6 that transmits and receives data to and from the network 1, and a two-dimensional code generating section 7. Note that, although some or all of these components are functions virtually actualized by an organic coupling of a software resource, such as an operating system or an application program, and a hardware resource, such as a computer (i.e. they have no concrete form), the present invention is not limited thereto, and they may be configured by hardware logic or the like (i.e. they may have a concrete form and exist physically).

The two-dimensional code generating section 7 uses a two-dimensional code generating tool and generates a two-dimensional code 8 containing a character string indicating the location of a predetermined folder 4a created in advance (or newly created) in the storage section 4, as an identifier. For example, "QR Code Editor" (http://freesoft-100.com/screen/qr-code-editor.html) can be used as the two-dimensional code generating tool.

Figures 2A, 2B:
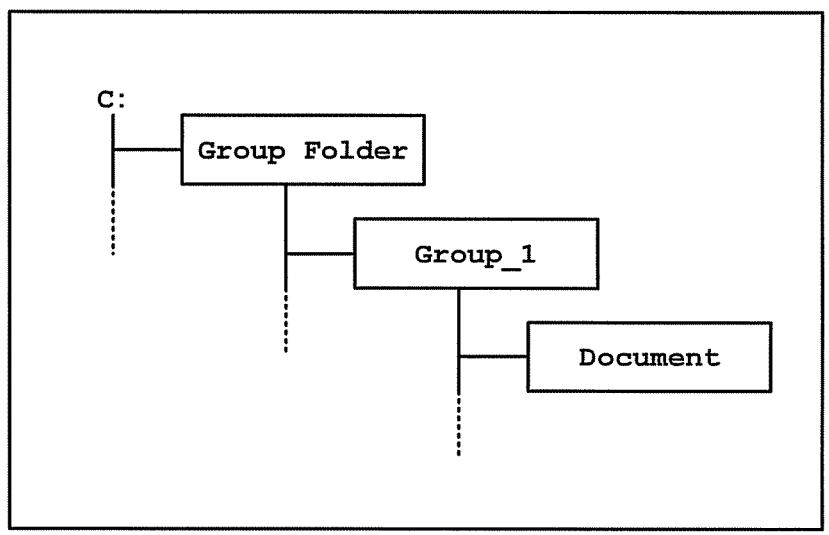
FIG. 2A and FIG. 2B are diagrams showing a folder structure in a storage section 4.

FIG. 2A and FIG. 2B are diagrams showing a folder structure in the storage section 4. In FIG. 2A, a folder named "GroupFolder" has been created in the root folder ("C: ¥") in the storage section 4, as an example. In addition, a folder named "Group_1" has been created in the layer below the "GroupFolder" folder, and a folder named "Document" has been created in the layer below the "Group_1" folder. When the "Document" folder in the lowest layer is the'above-described predetermined folder 4a, the character string indicating the location of the predetermined folder 4a is "C: ¥GroupFolder¥Group_1¥Document" as shown in FIG. 2B, and the two-dimensional code generating section 7 generates the two-dimensional code 8 containing this character string as an identifier.

Returning to FIG. 1, the mobile phone 3 includes at least an imaging section 9 having a function for capturing an image of a two-dimensional code, a communication section 10 that transmits and receives data to and from the network 1, a control section 11 including a computer, a file selecting section 13 that selects data to be stored (hereinafter referred to as "file 12" for convenience of explanation) in the server 2, and a file holding section 14 that holds the file 12. A specific configuration of the mobile phone 3 will be described in detail later. As in the case of the server 3, although some or all of these components are functions virtually actualized by an organic coupling of a software resource, such as an operating system or an application program, and a hardware resource, such as a computer (i.e. they have no concrete form), the present invention is not limited thereto, and they may be configured by hardware logic or the like (i.e. they may have a concrete form and exist physically).

The two-dimensional code 8 generated by the two-dimensional code generating section 7 of the server 2 in the above-described configuration is outputted as printed material or displayed on a display (not shown) so that the imaging section 9 of the mobile phone 3 can capture an image of the printed material or the display. Then, the captured data is loaded into the control section 11 of the mobile phone 3, and the control section 11 analyzes the two-dimensional code 8 and reproduces the above-described character string (the character string indicating the location of the predetermined folder 4a: see the character string in FIG. 2B). In addition, the control section 11 reads out the file 12 selected by the file selecting section 13 from the file holding section 14, and after designating the reproduced character string as a storage location, transmits the file 12 to the server 2 from the communication section 10, via the network 1.

As just described, by an easy operation to capture an image of the two-dimensional code 8 by the imaging section 9 of the mobile phone 3 and selecting the file 12, the file 12 can be stored in a predetermined storage destination (the predetermined folder 4a) on the server 2. Note that, although the data to be stored in this example is the file 12, the data is not limited to this "file", and can be any storable computer-processable data.

Next, a specific example of the mobile phone 3 in FIG. 1 will be described in detail, using an actual mobile phone 300.

Figure 3A:
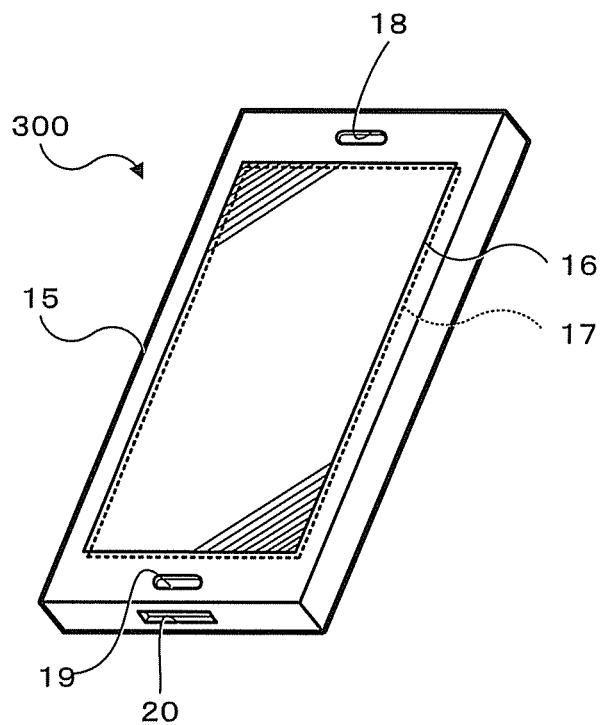
FIG. 3A to FIG. 3C are outer appearance views of a mobile phone 300.
Figure 3B:
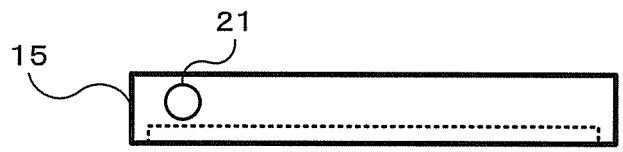
Figure 3C:
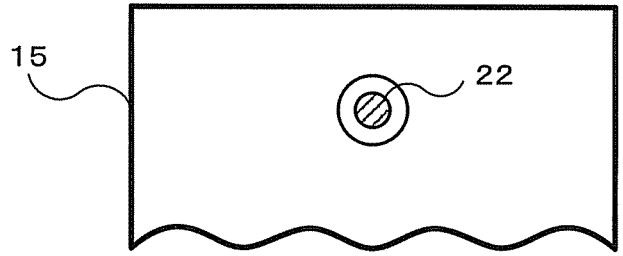

FIG. 3A to FIG. 3C are outer appearance views of the mobile phone 300. This mobile phone 300 has a housing 15 shaped such that the mobile phone 300 can be held in a hand (a tablet shape), as shown in FIG. 3A. On the main surface of the housing 15 which serves as an operation surface, a display section 17 on which a touch panel 16 is mounted, a receiver hole 18, and a mouthpiece hole 19 are provided. In addition, on the bottom surface of the housing 15 on the lower end side of the main surface, a connector 20 is provided which is used to connect the mobile phone 300 to an external interface (I/F) 28 described hereafter or to charge a power supply section 29 described hereafter. Moreover, on the top surface of the housing 15 on the upper end side of the main surface, a power button 21 is provided. On the surface (back surface) opposite to the main surface, an imaging lens 22 for an imaging section 25 described hereafter is provided.

Note that, although the smartphone-type mobile phone 300 having the tablet-shaped housing 15 has been given as an example in this embodiment, the present invention is not limited thereto, and the mobile phone 300 may have a foldable-type housing, a sliding-type housing, or other types of housing.

Figure 4:
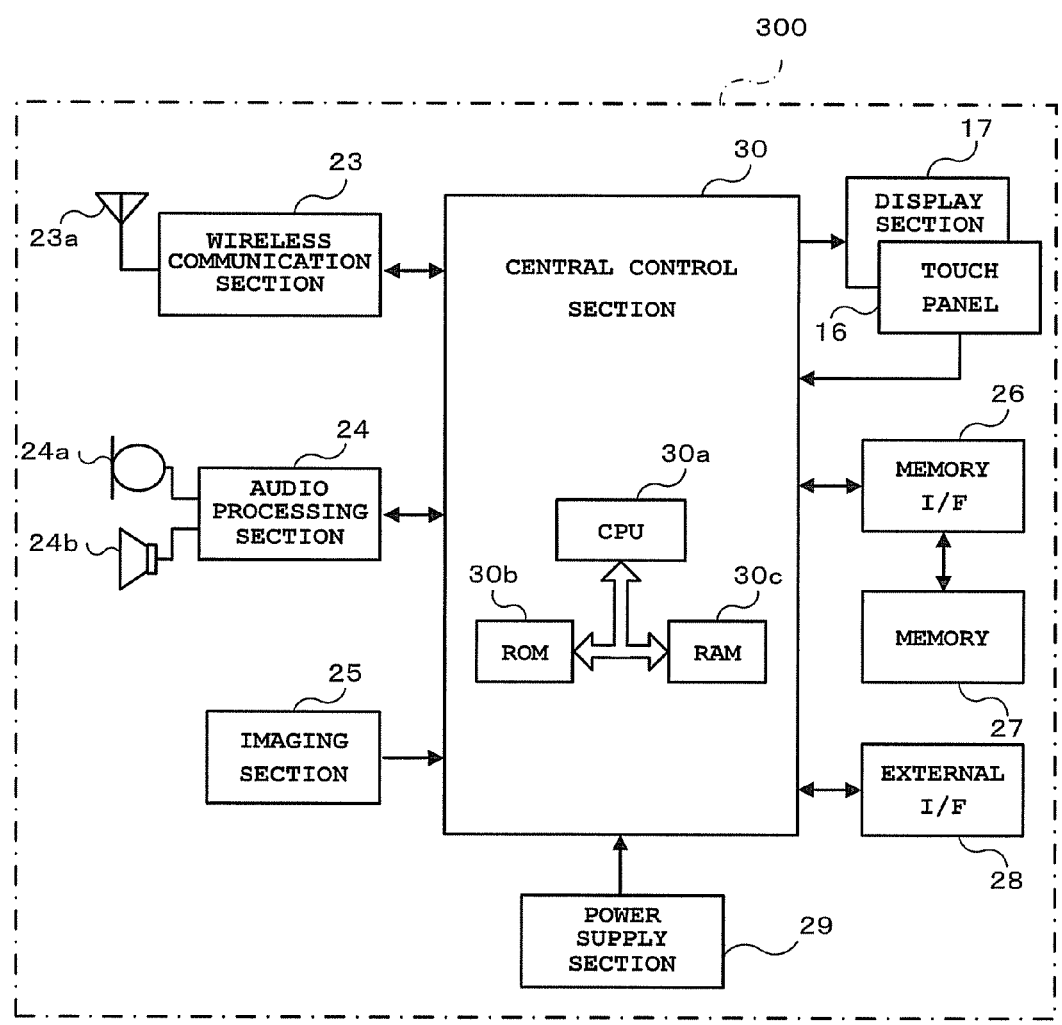
FIG. 4 is a block diagram showing the mobile phone 300.

FIG. 4 is a block diagram of the mobile phone 300. The mobile phone 300 includes a wireless communication section 23 (equivalent to the communication section 10 in FIG. 1), an audio processing section 24, the imaging section 25 (equivalent to the imaging section 9 in FIG. 1), the display section 17 including the touch panel 16, a memory I/F 26, a memory 27 (equivalent to the file holding section 14 in FIG. 1), the external I/F 28, the power supply section 29, a central control section 30 (equivalent to the control section 11 and the file selecting section 13 in FIG. 1), etc.

The wireless communication section 23 is a wireless communication section for mobile phones that wirelessly transmits and receives digital data to and from the nearest base station (not shown), via an antenna 23a. The digital data herein includes data of incoming and outgoing phone calls and data of voice calls exchanged between the mobile phone 300 and a mobile phone network or a common public telephone network. Also, it includes data exchanged between the mobile phone 300 and a resource (such as the server 2 in FIG. 1) on a network (such as the network 1 in FIG. 1) as required.

The wireless communication section 23 transmits and receives the above-described digital data under the control of the central control section 30.

Note that, although the wireless communication section 23 herein is a wireless communication section for mobile phones, the present invention is not limited thereto, and the wireless communication section 23 may be, for example, a wireless communication section for a wireless Local Area Network (LAN). In this instance, the wireless communication section 23 establishes a connection with a nearby wireless LAN relay device (access point) via the antenna 23a, and accesses a resource (such as the server 2 in FIG. 1) on a network (such as the network 1 in FIG. 1) connected to the access point, while wirelessly transmitting and receiving digital data.

The audio processing section 24 converts audio signals picked up by a microphone 24a into digital data, and outputs it to the central control section 30, under the control of the central control section 30. Also, the audio processing section 24 converts digital audio signals outputted from the central control section 30 into analog signals and emits amplified sound from a speaker 24b. The microphone 24a and the speaker 24b are used for listening and speaking during phone calls. This speaker 24b is also used to emit ringtones for phone calls.

The imaging section 25 includes an imaging lens 22 shown in FIG. 3, and a two-dimensional imaging device such as a Charge-Coupled Device (CCD) or a Complementary Metal Oxide Semiconductor (CMOS). This imaging section 25 captures a still image or a moving image of an arbitrary subject and outputs the image data to the central control section 30, under the control of the central control section 30.

The display section 17 is a flat-screen display device, such as a liquid crystal display, or an organic liquid crystal or Electroluminescent (EL) panel, and includes the touch panel 16 on the front surface. Note that, although the touch panel 16 is an independent component, the present invention is not limited thereto, and the touch panel 16 may be, for example, a built-in touch panel incorporated in the display section 17 (the touch panel layer is generally interposed between the protective glass and the display layer).

The memory I/F 26 is, for example, a general-purpose interface supporting the specification of the memory 27 (such as a Secure Digital [SD] card), which is positioned between the central control section 30 and the memory 27 and mediates their data exchange.

The memory 27 is a non-volatile and rewritable information storage component. A flash memory such as an SD card, a silicon disk, or a hard disk can be used as this memory 27, and various user data (such as an electronic phone book, data of images captured by the imaging section 25, and content data such as images and music downloaded from the Internet) are stored therein.

The external I/F 28 is a data interface between the mobile phone 300 and an external device, such as a personal computer. The external device is capable of accessing the memory 27, via the external I/F 28 and the central control section 30. User data stored in the memory 27 can be loaded into the external device, and user data in the external device can be loaded into the memory 27, as required.

The power supply section 29, which includes a battery composed of a primary cell or a rechargeable secondary cell, generates various power supply voltages required to operate the mobile phone 300, using power from the battery, and supplies the voltage to each section.

The central control section 30 contains control components of a program control system including a computer or a microcomputer (hereinafter referred to as a Central Processing Unit [CPU] 30a), a read-only semiconductor memory (hereinafter referred to as a Read-Only Memory [ROM] 30b), a high-speed semiconductor memory (hereinafter referred to as a Random Access Memory [RAM] 30c), and peripheral circuits (not shown). This central control section 30 performs various processing successively and controls the entire operation of the mobile phone 300, by loading a control program stored in advance in the ROM 30b into the RAM 30c and executing the program by the CPU 30a. Note that the ROM 30b may be a rewritable and non-volatile semiconductor memory (such as a flash memory or a Programmable Read-Only Memory [PROM]).

FIG. 5 is a diagram showing a flowchart of operations that are performed the mobile phone 300. This operational flow corresponds to the flow of the main portion of the control program that is executed by the CPU 30a of the mobile phone 300, and therefore the component that executes the following steps is the CPU 30a.

In this operational flow, the CPU 30a first activates the imaging section 25 (Step S1). Subsequently, the CPU 30a captures an image of a two-dimensional code (see the two-dimensional code 8 in FIG. 1) by the imaging section 25 (Step S2) (reading section). Then, the CPU 30a analyzes the two-dimensional code (Step S3) and reproduces a character string contained in the two-dimensional code (the character string indicating the location of the predetermined folder 4a in FIG.

Next, the CPU 30a selects a file (the file 12 in FIG. 1) to be stored in the predetermined folder 4a (selecting section) and loads it from the memory 27 (Step S4). Then, the CPU 30a transmits the file (the file 12 in FIG. 1) to a storage location indicated by the above-described character string, via the wireless communication section 23 (Step S5) (storing section).

As described above, in the present embodiment, a unique effect can be achieved in which, by a simple operation to capture an image of a two-dimensional code (the two-dimensional code 8 in FIG. 1: identifier) using the imaging section 25 of the mobile phone 300 and select a file (the file 12 in FIG. 1), the file can be stored in a predetermined storage destination (the predetermined folder 4a in FIG. 1) on the network.

Note that the file "selection" herein refers to the selection of a file based on the intent of the user, such as the user intentionally selecting a file from a file list. However, the present invention is not limited thereto, and the file may be selected by the system. For example, a configuration may be adopted in which the system selects a file including data (such as a photograph or a document) that is being displayed on the display section 17 as a file to be stored.

In the present embodiment, this file selection is performed after a two-dimensional code is analyzed. However, the present invention is not limited thereto, and the file selection may be performed before a two-dimensional code is analyzed.

Also, although the identifier in the present embodiment is a two-dimensional code, the present invention is not limited thereto, and it may be a one-dimensional code or the like. That is, any identifier that enables the recognition of a storage destination can be used.

Moreover, although the present invention has been applied to a mobile phone in the present embodiment, the present invention is not limited thereto, and can be applied to any computer-applied device having a camera function and a communication function, such as a Personal Digital Assistant (PDA), a personal computer, a gaming terminal, or a digital camera.

Furthermore, in the present embodiment, a storage destination for a file is the storage section 4 of the server 2 connected to the network 1. However, this is merely a preferred example that takes into account present-day network environments, such as cloud computing, and the present invention is not limited thereto. For example, the present invention may be applied to a stand-alone system. In this case, a folder (equivalent to the folder 4a in FIG. 1) is created in an arbitrary location of the memory 27 of the mobile phone 300, and a two-dimensional code indicating the location of this folder is created. Then, when data is required to be stored, this two-dimensional code is captured by the own imaging section 25, and the relevant file is stored in the location (the folder created in the own memory 27) indicated by the two-dimensional code, according to the same procedures as those of the above-described embodiment.

While the present invention has been described with reference to the preferred embodiments, it is intended that the invention be not limited by any of the details of the description therein but includes all the embodiments which fall within the scope of the appended claims.

What is claimed is:

1. A data storage device comprising:
 a data holding section which holds a plurality of data;
 a selecting section which selects, by user, an arbitrary piece of data from the plurality of data held by the data holding section;
 a reading section which reads an identifier of a storage destination desired by the user, from a plurality of identifiers that are generated in advance by an identifier generating section included in an external server and that respectively indicate storage destinations in a storage of the external server;
 a recognizing section which recognizes a storage destination in the storage of the external server for the arbitrary piece of data selected by the selecting section by analyzing the identifier read by the reading section; and
 a transmitting section which transmits the arbitrary piece of data to the external server and causes the external server to store the arbitrary piece of data in the storage destination recognized by the recognizing section.

2. The data storage device according to claim 1, wherein the storage destination is a folder in the storage of the external server; and
 wherein the transmitting section causing the external server to store the arbitrary piece of data in the folder recognized by the recognizing section.

3. The data storage device according to claim 2, wherein the identifier is a two-dimensional code;
 wherein the recognizing section recognizes a character string indicating the folder for the arbitrary piece of data by analyzing the two-dimensional code read by the reading section; and
 wherein the transmitting section causes the external server to designate the character string recognized by the recognizing section as the folder of the storage destination in the storage of the external server, and to store the arbitrary piece of data in the folder.

4. The data storage device according to claim 1, wherein the identifier is a two-dimensional code;
 wherein the recognizing section recognizes a character string indicating the storage destination in the storage of the external server for the arbitrary piece of data by analyzing the two-dimensional code read by the reading section: and
 wherein the transmitting section causes the external server to designate the character string recognized by the recognizing section as the storage destination in the storage of the external server, and to store the arbitrary piece of data in the storage destination.

5. A non-transitory computer-readable storage medium having stored thereon a program that is executable by a computer, the program being executable by the computer of a data storage device to perform functions comprising:
 selection processing for selecting, by user, an arbitrary piece of data from a plurality of data held in a data holding section of the data storage device;
 reading processing for reading an identifier of a storage destination desired by the user, from a plurality of identifiers that are generated in advance by an identifier generating section included in an external server and that respectively indicate storage destinations in a storage of the external server;
 recognition processing for recognizing a storage destination in the storage of the external server for the arbitrary piece of data by analyzing the identifier read by the reading processing; and
 transmitting processing for transmitting the arbitrary piece of data to the external server and causes the external server to store the arbitrary piece of data in the storage destination recognized by the recognition processing.

6. A non-transitory computer-readable storage medium having stored thereon a program that is executable by a computer, the program being executable by the computer of a data storage device to perform functions comprising:
 selection processing for selecting, by user, an arbitrary data from a plurality of data held in a data holding section of the data storage device;
 reading processing for reading a two-dimensional code of a storage destination desired by the user, from a plurality of two-dimensional codes that are generated in advance by an two-dimensional code generating section included in an external server and that respectively indicate storage destinations in a storage of the external server;
 recognition processing for recognizing a character string indicating the storage destination in the storage of the external server for the arbitrary piece of data by analyzing the two-dimensional code read by the reading processing; and
 transmitting processing for transmitting the arbitrary piece of data to the external server, and causing the external server to designate the character string recognized by the recognition processing as the storage destination in the storage of the external server, and to store the arbitrary piece of data in the storage destination.

* * * * *